United States Patent [19]

McNaul

[11] Patent Number: 4,556,888

[45] Date of Patent: Dec. 3, 1985

[54] POLARIZATION MEASUREMENT SYSTEM AND METHOD

[75] Inventor: William F. McNaul, Escondido, Calif.

[73] Assignee: Cubic Corporation, San Diego, Calif.

[21] Appl. No.: 399,827

[22] Filed: Jul. 19, 1982

[51] Int. Cl.$^4$ ..................... H01Q 21/06; H01Q 21/24; H04B 7/10

[52] U.S. Cl. ..................................................... 343/362

[58] Field of Search ............... 343/361, 362, 363, 364, 343/365, 366

[56] References Cited

U.S. PATENT DOCUMENTS 3,523,294 8/1970 Okamura et al. .................. 343/100
3,540,045 11/1970 Taylor ................................. 343/7.5
3,557,021 12/1967 Allen .................................. 343/100
3,735,266 5/1973 Amitay .................................. 325/60
3,742,149 6/1973 Yoshida et al. ................. 179/15 FS
3,742,506 6/1973 Wilkinson .......................... 343/176
3,760,274 9/1973 Vogt ..................................... 325/26
3,836,973 9/1974 Shnitkin et al. ..................... 343/113
3,956,699 5/1976 Leahy ................................... 325/15
4,005,425 1/1977 Nagy .................................. 343/17.7
4,035,797 7/1977 Nagy ............................... 343/5 SA
4,084,137 4/1978 Welti ..................................... 325/30
4,090,137 5/1978 Soma et al. ........................... 325/60
4,112,370 9/1978 Monsen ................................. 325/40
4,114,153 9/1978 Neidell ................................... 343/9
4,195,262 3/1980 King ...................................... 455/67
4,197,541 4/1980 Nemit .................................. 343/100
4,233,576 11/1980 Pelchat ................................. 333/16
4,268,832 5/1981 Christian et al. ................... 343/786
4,283,795 8/1981 Steinberger ......................... 455/283
4,329,687 5/1982 Kloevekorn et al. .......... 343/365 X

OTHER PUBLICATIONS

Grossbach, "Degradation of Polar-Discriminator Performance by Non-Ideal Components", Microwave Journal, Dec. 1974, pp. 53, 54 & 68.

Anaren Catalog, Anaren Microwave, Inc. Syracuse, N.Y., 1980, pp. 243-246.

*Primary Examiner*—Theodore M. Blum
*Assistant Examiner*—John B. Sotomayor
*Attorney, Agent, or Firm*—Brown, Martin & Haller

[57] ABSTRACT

A system for processing two coherent RF signals respectively provided from two differently oriented receivers of RF radiation, to measure the polarization of the received radiation. A switch combines the two received signals in a repetitive time-shared sequence over a single channel. During each cycle one of the received signals is switched onto the channel for a first predetermined period and the other received signal subsequently is switched onto the channel for a longer second predetermined period that is an integer multiple of the first period. In order to determine the relative amplitude of the two received signals, the combined signal is delayed by one first predetermined period; and the delayed and undelayed combined signals are compared to thereby provide relative amplitude indication signals. In order to determine the relative phase of the two received signals, the combined signal is divided into two parts, and one part of the divided signals is delayed by one first predetermined period; the delayed and undelayed divided signals are processed by a polar discriminator to provide a combination of signals having amplitudes that are a function of the relative phase of the two received signals; and the combination of signals are encoded by a phase angle encoder to thereby provide a relative phase indication signal. The relative amplitude indication signals and the relative phase indication signal are processed by sampling the indication signals during intervals occurring at a rate of once per delay period and comparing the samples to provide an indication of the polarization of the received radiation.

16 Claims, 12 Drawing Figures

FIG. 2A
FIG. 2B
FIG. 2C
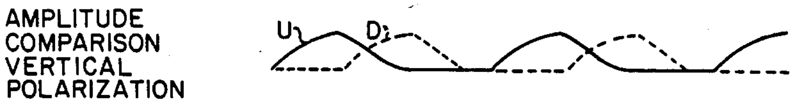
FIG. 2D
| | | | | | | |
|---|---|---|---|---|---|---|
| LINE 54 SAMPLE NO. | 1 | 2 | 3 | 1 | 2 | 3 |
| LINE 51 U > D | 1 | 0 | 0 | 1 | 0 | 0 |
| LINE 52 D > U | 0 | 1 | 0 | 0 | 1 | 0 |
FIG. 2E
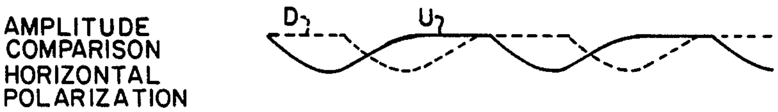
FIG. 2F
| | | | | | | |
|---|---|---|---|---|---|---|
| LINE 54 SAMPLE NO. | 1 | 2 | 3 | 1 | 2 | 3 |
| LINE 51 U > D | 0 | 1 | 0 | 0 | 1 | 0 |
| LINE 52 D > U | 1 | 0 | 0 | 1 | 0 | 0 |
FIG. 2G
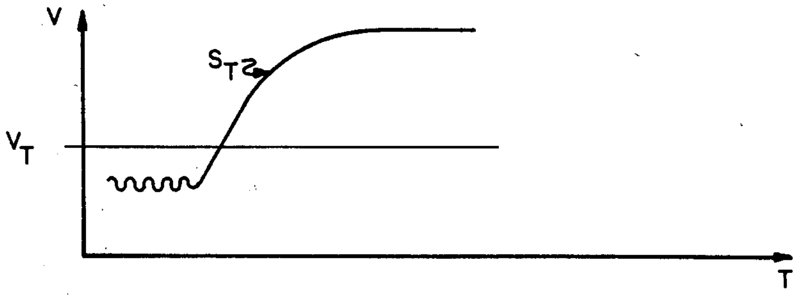
FIG. 3

FIG. 4
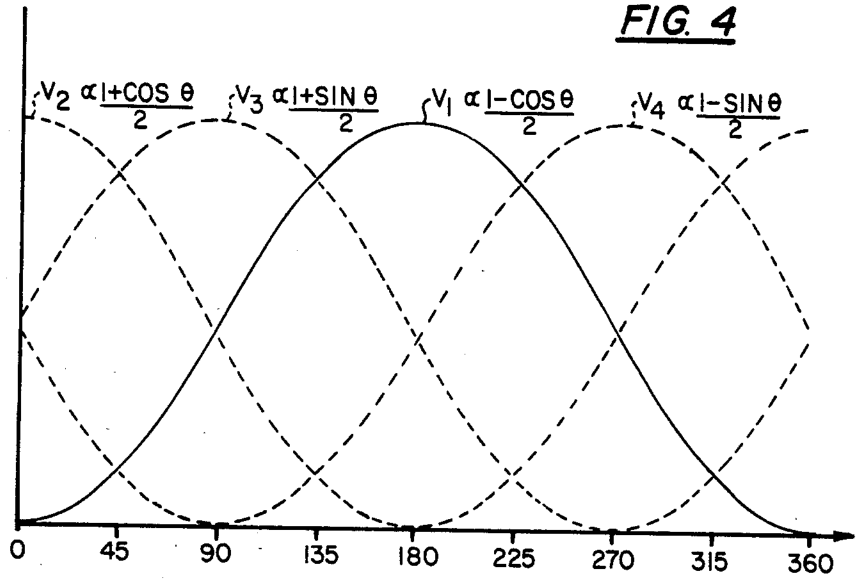
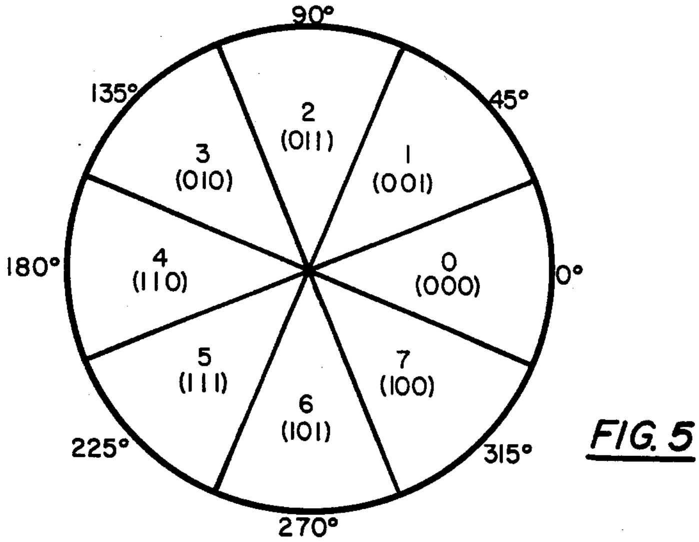
FIG. 5
| LINE 54 SAMPLE NO. | 1 | 2 | 3 | POLARIZATION |
|---|---|---|---|---|
| LINE 64 SECTOR NO. | 0 | 0 | 0 | SLANTED +45° |
| | 4 | 0 | 4 | SLANTED −45° |
| | 2 | 0 | 6 | RIGHT HAND CIRCULAR |
| | 6 | 0 | 2 | LEFT HAND CIRCULAR |
FIG. 6

POLARIZATION MEASUREMENT SYSTEM AND METHOD

BACKGROUND OF THE INVENTION

The present invention pertains generally to electromagnetic radiation polarization measurement systems and is particularly directed to an improved system and corresponding method for processing two coherent RF signals respectively provided from two differently oriented receivers of RF radiation to measure the polarization of the received radiation.

Typically the differently oriented receivers are sensitive to orthogonally polarized RF radiation, such as in a crossed log periodic antenna utilized as a feed for a parabolic dish. Within the context of the present invention, the term "differently oriented receivers" also refers to functionally equivalent antennas, such as a dual polarized horn antenna.

For some applications, it is desirable to combine the two received signals for transfer over a single communication channel, such as when a waveguide rotary joint forms a portion of the communications link between the receiving antenna and portions of a signal processing system. The system of the present invention is useful for such applications, although its use is not necessarily limited to systems so including a rotary joint.

SUMMARY OF THE INVENTION

The present invention is a system including a switch for combining the two received signals in a repetitive time-shaped sequence over a single channel, wherein during each cycle one of the received signals is switched onto the channel for a first predetermined period and the other received signal subsequently is switched onto the channel for a longer second predetermined period that is an interger multiple of the first period; an amplitude encoder for determining the relative amplitude of the two received signals by delaying the combined signal by one first predetermined period and comparing the delayed and undelayed combined signals to thereby provide relative amplitude indication signals; a circuit for determining the relative phase of the two received signals by dividing the combined signal into two parts, delaying one part of the divided signal by one first predetermined period, processing the delayed and undelayed divided signals to provide a combination of signals having amplitudes that are a function of the relative phase of the two received signals, and encoding the combination of signals to thereby provide a relative phase indication signal; and a processor for processing the relative amplitude indication signals and the relative phase indication signal by sampling the indication signals during intervals occurring at a rate of once per delay period and comparing the samples to provide an indication of the polarization of the received radiation. The present invention is also the method corresponding to the above-described system.

Additional features of the present invention are described in relation to the description of the preferred embodiment.

BRIEF DESCRIPTION OF THE DRAWING

FIG. 2A shows the waveform of the clock signal provided by the clock and driver circuit in the system of FIG. 1.

FIG. 2B shows the waveform of the switching signal provided by the pulse generator in the system of FIG. 1.

FIG. 2C shows the waveform of the strobe signal provided by the clock and driver circuit in the system of FIG. 1.

FIG. 2D shows the waveforms of the delayed and undelayed combined signals in the amplitude encoder in the system of FIG. 1 when the polarization of the received RF radiation is vertical.

FIG. 2E is a table showing the pattern of the relative amplitude indication signals provided by the amplitude encoder in the system of FIG. 1 over all of the sample intervals of each cycle when the polarization of the received RF radiation is vertical.

FIG. 2F shows the waveforms of the delayed and undelayed combined signals in the amplitude encoder in the system of FIG. 1 when the polarization of the received RF radiation is horizontal.

FIG. 2G is a table showing the pattern of the relative amplitude indication signals provided by the amplitude encoder in the system of FIG. 1 over all of the sample intervals in each cycle when the polarization of the received RF radiation is horizontal.

FIG. 3 shows a sample waveform of the combined signal in the system of FIG. 1 during the transition when an RF signal is initially received.

FIG. 4 shows the waveforms of the signals provided by the polar discriminator in the system of FIG. 1.

FIG. 5 is a sector diagram showing the relationship of the binary value of the relative phase indication signal provided by the phase angle encoder in the system of FIG. 1 to the relative phase $\Delta\phi$ of the received RF signals provided to the RF switch in said system.

FIG. 6 is a table showing a typical pattern of the relative phase indication signals provided by the phase angle encoder in the system of FIG. 1 over all of the sample intervals in each cycle for four different types of polarization of the received RF radiation.

DESCRIPTION OF THE PREFERRED EMBODIMENT

Figure 1:
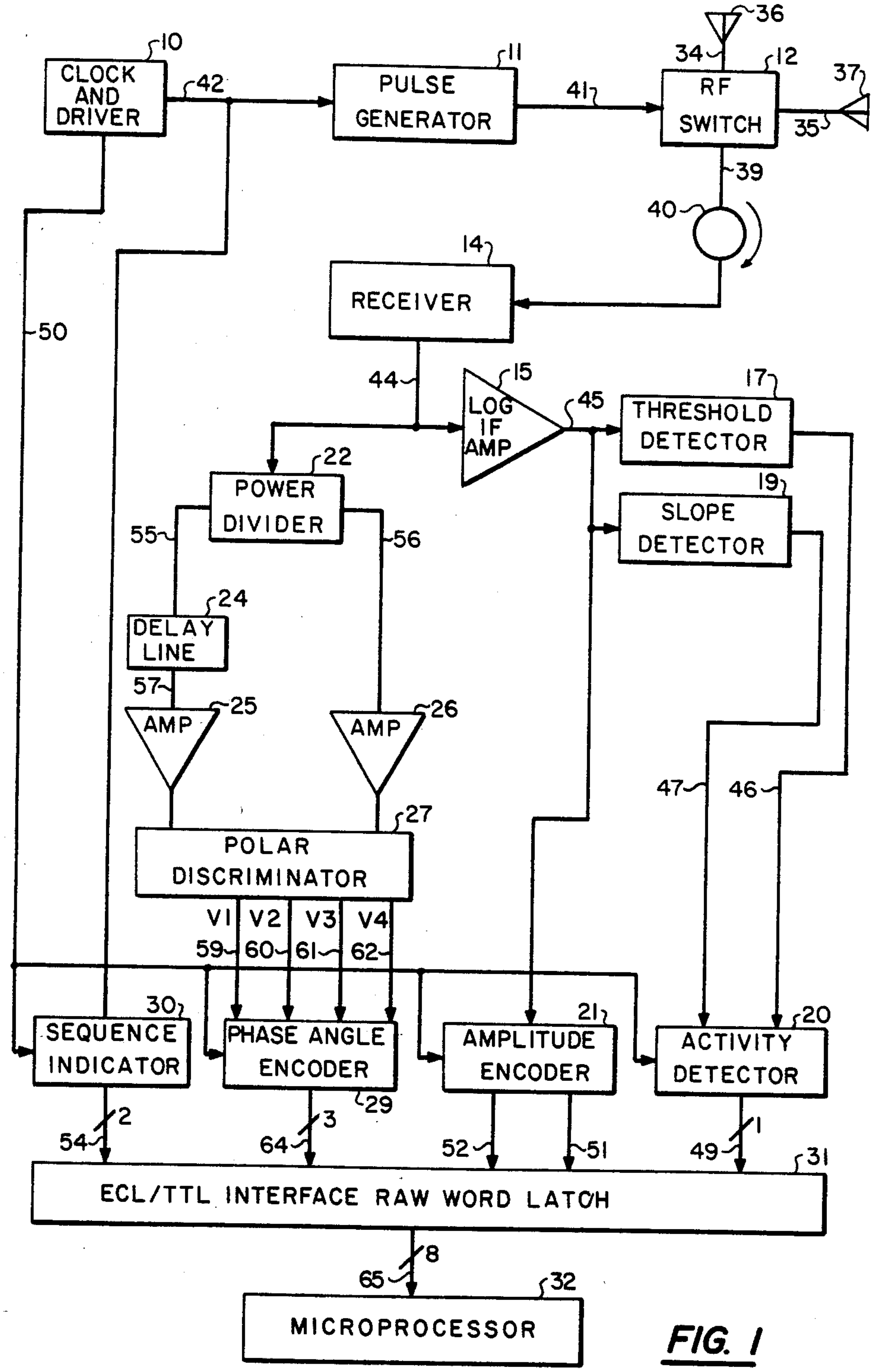
FIG. 1 is a block diagram of the preferred embodiment of the system of the present invention.

Referring to FIG. 1, the preferred embodiment of the system of the present invention includes a clock and driver circuit 10, a pulse generator 11, an RF switch 12, an RF receiver 14, a log IF amplifier 15, a threshold detector 17, a slope detector 19, an activity detector 20, an amplitude encoder 21, a power divider 22, a delay line 24, limiting amplifiers 25 and 26, a polar discriminator 27, a phase angle encoder 29, a sequence indicator 30, an ECL/TTL interface raw word latch 31 and a microprocessor 32.

The system of FIG. 1 processes two coherent RF signals respectively provided on lines 34 and 35 from a vertically oriented RF antenna 36 and a horizontally oriented RF antenna 37 to measure the polarization of RF radiation received by the two antennas 36, 37. Preferably the vertical and horizontal antennas 36, 37 are embodied in either a single crossed log periodic antenna or a dual polarized horn antenna. In either embodiment, the antenna would be utilized as the feed element with a parabolic dish.

The RF switch 12 combines the two received RF signals from lines 34 and 35 in a repetitive time-shared sequence over a single channel 39. The single channel 39 may include a rotary joint 40. The RF switch 12 operates in response to a switching signal on line 41 (as shown n FIG. 2B) from the pulse generator 11 to cause the received signal on line 34 from the vertically oriented antenna 36 to be switched onto the single channel 39 for a predetermined period of 100 nanoseconds (nsec) while the switching signal on line 41 is high, and to cause the received signal on line 35 from the horizontally oriented antenna 37 to be switched onto the single channel 39 for a longer period of 200 nsec while the switching signal on line 41 is low. The pulse generator 11 provides the switching signal on line 41 in response to a clock signal on line 42 (as shown in FIG. 2A) from the clock and driver circuit 10. The clock signal on line 42 is a pulsed square wave signal that undergoes a state transition at 100 nsec intervals.

The receiver 14 receives the combined signal from line 39 and provides the combined signal onto line 44 at an intermediate frequency (IF) of 160 Megahertz (MHz).

The log IF amplifier 15 amplifies the combined IF signal on line 44 to provide a combined signal on line 45 having an amplitude that is logarithmically proportional to the power of the signal on line 44.

The threshold detector 17 provides a threshold indication signal on line 46 for indicating whether the amplitude of the combined signal on line 45 exceeds a predetermined voltage threshold $V_T$ (as shown in FIG. 3).

The slope detector 19 provides a slope indication signal on line 47 for indicating whether the slope of the combined signal on line 45 is less than a predetermined slope as shown by the slope of the curve illustrated in FIG. 3 at point $S_T$. The activity detector 20 is a logic circuit which provides an activity indication signal on line 49 for indicating when the combined signal on line 45 has an amplitude greater than the predetermined threshold voltage $V_T$ and a slope less than the predetermined slope at the point $S_T$.

The activity detector 20 thereby does not recognize either noise below the threshold level $V_T$ or sudden sporadic signal transitions as valid activity.

The activity indication signal on line 49 is provided to the latch 31 in response to the leading edge of each strobe signal pulse on line 50. The strobe signal (FIG. 2C) is provided on line 50 by the clock and driver circuit 50, and is timed so that the leading edge of each strobe signal pulse occurs shortly before each transition in the pulse clocked signal on line 42, as shown in FIG. 2.

The amplitude encoder 21 determines the relative amplitude of the two received signals on lines 34 and 35 by delaying the combined signal on line 45 by the predetermined period of 100 nsec and by comparing the delayed and undelayed combined signals to thereby provide two relative amplitude indication signals on the two lines 51 and 52.

The operation of the amplitude encoder 21 is described with reference to the signal waveforms shown in FIG. 2. A sample interval is 100 nsec which corresponds to the interval between transitions of the clock signal (FIG. 2A). Accordingly, each sample interval corresponds to the period by which the combined signal is delayed within the amplitude encoder 21. The sequence indicator 30 is a three-bit counter which counts the transitions in the clock signal on line 42 and provides a binary sequence indication signal on the two lines 54 for indicating a sample number that varies between 1 and 3. The binary indication signals on the two line 54 are used in the microprocessor comparison of the relative amplitude indication signals on lines 52 and 51. The pulse generator 11 responds to the clock signal on line 42 by providing a high level switching signal (FIG. 2B) on line 41 during every third sample interval beginning with the first transition of the clock signal, so that the switching signal on line 41 is high whenever the sequence indication signals on the two lines 54 indicate a count corresponding to the first sample interval. In FIG. 2, the first sample interval is designated by the number "1". During the two intervening sample intervals of each cycle (designated "2" and "3"), the pulse generator 11 provides a low level switching signal on line 41.

FIG. 2D illustrates the relative amplitudes of the delayed and undelayed combined signals that are compared by amplitude encoder 21 when the polarization of the received radiation is predominantly vertical so as to cause the amplitude of the RF signal received on line 34 to be greater than the amplitude of the RF signal received on line 35. The undelayed combined signal "U" is indicated by a solid line and the delayed combined signal "0" is indicated by a dashed line. The relative amplitude indication signal is provided by the amplitude encoder 21 on the two lines 51 and 52 and the sequence indication signals are provided by the sequence indicator 30 on the two lines 54 to the latch 31 in response to the leading edge of each strobe signal pulse on line 50. Referring to FIGS. 2C, 2D and 2E it is noted that the strobe signal causes the relative amplitude indication signals on the two lines 51 and 52 to be provided by the amplitude encoder 21 in response to a comparison of the delayed and undelayed combined signals that is made shortly before the end of each sample interval when the respective slopes of the delayed and uncombined signals are less than the predetermined slope. When upon being compared in response to the leading edge of the strobe signal, the undelayed signal exceeds the delayed signal by a predetermined amplitude of 6 dB, (U>D), a binary "1" indication signal is provided on line 51. When upon being compared in response to the leading edge of the strobe signal, the delayed signal exceeds the undelayed signal by a predetermined amplitude of 6 dB, (D>U), a binary "1" indication signal is provided on line 52. Thus when the polarization of the received RF radiation is predominantly vertical so as to produce the sequence of delayed and undelayed combined signals having the relative amplitudes shown in FIG. 2D, the bit pattern on the two lines 51 and 52 during the sample intervals, "1", "2" and "3" are respectively 100 on line 51 and 010 on line 52, as shown in FIG. 2E. During the sample interval "1" the binary indication signal on the two lines 54 is such that a 0 is in the higher order bit position with a 1 in the lower order bit position. The microprocessor 32 compares, during the same interval "1", the binary indication signal 01 with the bits respectively provided on lines 52 and 51 which are 01. During the sample interval "2", the binary indication signal on the two lines 54 in such that a 1 is in the higher order bit position with a 0 in the lower order bit position. The microprocessor 32 compares, during the sample interval "2", the binary indication signal 10 with the bits respectively provided on lines 52 and 51 which are 10.

FIG. 2F illustrates the relative amplitudes of the delayed and undelayed combined signals that are compared by the amplitude encoder 21 when the polarization of the received radiation is predominantly horizontal so as to cause the amplitude of the RF signal on line 35 to be greater than the amplitude of the RF signal received on line 34. The symbol nomenclature in FIG. 2F is the same as that in FIG. 2D. Referring to FIG. 2G it is seen that when the polarization of the received RF radiation is predominantly horizontal so as to produce the sequence of delayed and undelayed combined signals shown in FIG. 2F, the bit pattern on the two lines 51 and 52 during the sample intervals "1", "2" and "3" are respectively 010 on line 51 and 100 on line 52. The microprocessor 32 compares, during the sample interval "1", the binary indcation signal 01 with the bits respectively provided on lines 52 and 51 which are 10. The microprocessor 32 compares, during the sample interval "2", the binary indication signal 10 with the bits respectively provided on lines 52 and 51 which are 01.

When the polarization of the received RF radiation is neither predominantly vertical nor predominantly horizontal, the bit patterns on both lines 51 and 52 remain at "0" during all sample intervals.

The polarization of the received RF radiation, when neither predominantly vertical nor predominantly horizontal, is determined by examining the relative phase characteristics of the received RF signals on lines 34 and 35. To accomplish such examination, the combined signal on line 44 is first divided by the power divider to provide first and second divided signals on lines 55 and 56 respectively. The delay line 24 delays the first divided signal on line 55 by the predetermined delay period of 100 nsec to provide a delayed divided signal on line 57. The delayed divided signal on line 57 and the undelayed divided signal on line 56 are passed through the limit amplifiers 25 and 26 respectively into the polar discriminator 27.

The polar discriminator 27 processes the delayed and undelayed signals from lines 57 and 56 respectively to provide a combination of signals V1, V2, V3 and V4 on lines 59, 60, 61 and 62 respectively, having amplitudes that are a function of the relative phase of the received signals. The signals V1, V2, V3 and V4 bear the following respective functional relationships to the phase angle $\theta$ between the signals on lines 56 and 57:

$$V1\ \alpha(1-\cos\theta)/2$$

$$V2\ \alpha(1+\cos\theta)/2$$

$$V3\ \alpha(1+\sin\theta)/2$$

$$V4\ \alpha(1-\sin\theta)/2$$

The relative phase $\Delta\phi$ of the two received RF signals on lines 34 and 35 bears the following relationship to the phase angle $\theta$:

$$\Delta\phi=\theta-l/\lambda,$$

where $\lambda$ is the wavelength of the received radiation, and $$l\cong T\ v;$$

wherein T is the delay period provided by the delay line 24 and v is the velocity of signal propagation for line 55.

FIG. 4 illustrates the waveforms of the signals V1, V2, V3 and V4 over a phase difference angle $\theta$ range of from 0° to 360°.

The phase angle encoder 29 compares the signals V1, V2, V3 and V4 on lines 59, 60, 61 and 62 from the polar discriminator 27 and translates $\theta$ to $\Delta\phi$; and in response to such comparison and translation, provides a three-bit indication signal on the three lines indicating the relative phase $\Delta\phi$ of the received RF signals on lines 34 and 35. The three-bit relative phase indication signal on the three lines 64 indicates which one of the eight 45° sectors in a range of from 0° to 360° the relative phase $\Delta\phi$ is in. These eight sectors are illustrated in FIG. 5. The relative phase indication signal is provided by the phase angle encoder 29 on the three lines 64 to the latch 31 in response to the leading edge of each strobe signal pulse on line 50. Accordingly, during each sample interval a raw eight-bit word is provided to the latch 31 on line 49 from the activity decoder 20, on lines 51 and 52 from the amplitude encoder 21, on the three lines 64 from the phase angle encoder 29 and on the two lines 54 from the sequence indicator 30. This raw eight-bit word is provided on eight lines 65 to the microprocessor 32.

The microprocessor 32 compares the relative amplitude indication signals from lines 51 and 52 and the relative phase amplitude signals from the three lines 64 during each sample interval with reference to the beginning of each cycle of combining the received RF signals, as indicated by the sequence indication signal on the two lines 54, to thereby provide an indication of the polarization of the received radiation.

The microprocessor 32 provides an indication of such polarization only when the activity indication signal on line 49 from the activity indicator indicates valid activity on line 45. The microprocessor 32 indicates that the polarization of the received radiation is one of six different types (1) vertical, (2) horizontal, (3) linear slanted at plus 45°, (4) linear slanted at minus 45°, (5) right-hand-circular, or (6) left-hand-circular. The microprocessor 32 provides such indication of polarization only after comparing the amplitude indication signals on lines 51 and 52 and the phase indication signals on the three lines 64 that are taken during all of the sample intervals over each complete cycle of combining the received RF signals from lines 34 and 35.

Comparisons of the amplitude indication signals from lines 51 and 52 over all three sample intervals are illustrated in FIGS. 2E and 2G discussed hereinabove. When the amplitude indication signals from lines 51 and 52 have the pattern shown in FIG. 2E over sample intervals "1", "2", and "3" from the beginning of each cycle, the microprocessor indicates that the received radiation is vertically polarized. When the amplitude indication signals from lines 51 and 52 have the pattern shown in FIG. 2G over sample intervals "1", "2" and "3" from the beginning of each cycle, the microprocessor 32 indicates that the received radiation is horizontally polarized. If either the pattern shown in FIG. 2E or the pattern shown in FIG. 2F over the respective sample intervals is recognized by the microprocessor 32, the microprocessor ignores the content of the three-bit phase indication signal on the three lines 64.

When neither vertical nor horizontal polarization is indicated, the microprocessor 32 compares the phase indication signals provided on the three lines 64 during all of the sample intervals over each complete cycle of combining the received signals. The correlation between such comparison and the different polarization types is described with reference to FIGS. 5 and 6. FIG. 6 shows the relative sectors in which the relative phase $\Delta\phi$ falls during successive sample intervals during each cycle. The binary value of the three-bit phase indication signal on the three lines 64 corresponds to one of the sectors shown in the relative-phase sector diagram of FIG. 5. However, it should be noted that the binary indication values do not necessarily correspond to the sector number. A Gray binary code is used in changing the binary indication values when progressing from one sector to an adjacent sector. For example, a binary value indication of 0 (i.e. "000") by the three-bit relative phase indication signal on the three lines 64 indicates that the relative phase is in sector "0" (FIG. 5), which is approximately 0 degrees. A binary value indication of 3 (011) by the phase indication signal indicates that the relative phase is in sector "2", which is approximately 90°.

It is from the pattern of the relative phase $\Delta\phi$ indications during the successive sample intervals that the polarization of the received radiation is determined by the microprocessor 32.

The microprocessor 32 compares the pattern of Gray binary codes corresponding to the relative phase $\Delta\phi$ occurring during successive sample intervals with predetermined patterns stored in the microprocessor to determine the polarization of the received radiation. Accordingly, in FIG. 6, the relative phase $\Delta\phi$ sector, as indicated by the three-bit signal on the three lines 64, is shown as sector 0 during the second sample interval for all four types of polarization.

When the relative phase indication signals on the three lines 64 indicates a pattern in which the relative phase $\Delta\phi$ is in the same sector during all three sample intervals, the microprocessor 32 indicates that the polarization is slanted at plus 45°.

When the relative phase indication signals on the three lines 64 indicate a pattern in which the relative phase $\Delta\phi$ during the first and third sample intervals is offset from the relative phase $\Delta\phi$ during the second sample interval by four sectors, the microprocessor 32 indicates that the polarization is slanted at minus 45°.

When the relative phase indication signals on the three lines 64 indicate a pattern in which the relative phase $\Delta\phi$ during the second sample interval lags the relative phase $\phi$ during the first sample interval by two sectors and leads the relative phase $\Delta\phi$ during the third sample interval by two sectors, the microprocessor 32 indicates that the polarization is right-hand-circular.

When the relative phase indication signals on the three lines 64 indicate a pattern in which the relative phase $\Delta\phi$ during the second sample interval leads the relative phase $\Delta\phi$ during the first sample interval by two sectors and lags the relative phase during the third sample interval by two sectors, the microprocessor 32 indicates that the polarization is left hand circular.

I claim:

1. A system for processing two coherent RF signals respectively provided from two differently oriented receivers of RF radiation, to measure the polarization of the received radiation, comprising means for combining the two received signals in a predetermined repetitive sequence into a single combined signal, each repetition of said sequence providing said combined signal with one of the two received signals for a first predetermined period followed by the other of the two received signals for a second predetermined period that is an integer multiple of the first predetermined period;

means coupled to the combining means for determining the relative amplitude of the two received signals by delaying the combined signal by one first predetermine period and comparing the delayed and undelayed combined signals so as to provide relative amplitude indication signals;

means coupled to the combining means for determining the relative phase of the two received signals by dividing the combined signals into two parts, delaying one part of the divided signal for a third predetermined period equal in duration to said first predetermined period, processing the delayed and undelayed divided signals to provide a combination of signals having amplitudes that are a function of the relative phase of the two received signals, and encoding said combination of signals so as to provide a relative phase indication signal; and means coupled to the relative amplitude determining means and the relative phase determining means for processing the relative amplitude indication signals and the relative phase indication signal by sampling the indication signals at least once during successive sample intervals occurring contemporaneously with said first predetermined period and each integer multiple of said first predetermined period in said second predetermined period for each repetition of said sequence and comparing the pattern of the samples with a predetermined pattern so as to provide an indication of the polarization of the received radiation.

2. A system according to claim 1 further comprising a single channel rotary joint coupled between said combining means and said relative amplitude determining means, and coupled between said combining means and said relative phase determining means.

3. A system according to claim 1, wherein the second predetermined period is twice the first predetermined period.

4. A system according to claim 1, wherein the means for determining the relative phase of the two received signals includes a polar discriminator for processing the delayed and undelayed divided signals to provide the combination of signals having amplitudes that are a function of the relative phase of the received signals.

5. A system according to claim 4, wherein the means for determining the relative phase of the two received signals includes a phase angle encoder for comparing the signals from the polar discriminator to provide a relative phase indication signal.

6. A system according to claim 1, further comprising means for providing a sequence indication signal to the means for processing the indication signals in order to process the indication signals in reference to the beginning of each repetition of said sequence.

7. A system according to claims 1 or 6, wherein the means for processing the indication signals compares the pattern of samples taken during all of the sample intervals occurring in a series of repetitions of said sequence with a predetermined pattern so as to provide said indication of polarization.

8. A method of processing two coherent RF signals respectively provided from two differently oriented receivers of RF radiation to measure the polarization of the received radiation, comprising the steps of:

(a) combining the two received signals in a predetermined repetitive sequence into a single combined signal, wherein each repetition of said sequence provides the combined signal with one of the two received signals for a first predetermined period followed by the other of the two received signals for a second predetermined period that is an integer multiple of the first predetermined period;

(b) determining the relative amplitude of the two received signals by delaying the combined signal by one first predetermined period and comparing the delayed and undelayed combined signals so as provide relative amplitude indication signals;

(c) determining the relative phase of the two received signals by dividing the combined signal into two parts, delaying one part of the divided signal by one first predetermined period, processing the delayed and undelayed divided signals to provide a combination of signals having amplitudes that are a function of the relative phase of the two received signals, and encoding said combination of signals so as to provide a relative phase indication signal; and (d) processing the relative amplitude indication signals and the relative phase indication signal by sampling the indication signals at least once during successive sample intervals occurring contemporaneously with said first predetermined period and each integer multiple of said first predetermined period in said second predetermined period for each repetition of said sequence and comparing the pattern of samples with a predetermined pattern so as to provide an indication of the polarization of the received radiation.

9. A method according to claim 8 further comprising the steps:

(e) providing the combined signal through a single channel rotary joint.

10. A method according to claim 8, wherein step (c) includes the step of:

(e) comparing the combination of signals to provide the relative phase indication signal.

11. A method according to claim 8, wherein step (c) includes the step of:

(e) comparing the combination of signals to provide the relative phase indication signal.

12. A method according to claim 8, further comprising the step of:

(e) providing a sequence indication signal to the means for processing the indication signals in order to process the indication signals in reference to the beginning of each repetition of said sequence.

13. A method according to claims 8 or 12, wherein step (d) comprises the step of:

(f) comparing the pattern of samples taken during all of the sample intervals occurring in a series of repetitions of said sequence with a predetermined pattern so as to provide said indication of polarization.

14. A system according to claim 1 further comprising means coupled to said combining means, said relative amplitude determining means and said relative phase determining means for heterodyning the combined signal received from said combining means and providing the heterodyned combined signal to said relative amplitude determining means and said relative phase determining means.

15. A method according to claim 8, further comprising the step of:

(e) heterodyning the combined signal.

16. A method according to claim 15 wherein said heterodyned combined signal is used in determining the relative amplitude and relative phase of the two received signals.

* * * * *